(12) United States Patent
Brill

(10) Patent No.: US 9,353,896 B2
(45) Date of Patent: May 31, 2016

(54) NON-ROTATING MECHANICAL JOINT FOR A HOSE COUPLING

(71) Applicant: CATERPILLAR INC., Peoria, IL (US)

(72) Inventor: Aaron T. Brill, Menominee, MI (US)

(73) Assignee: Caterpillar Inc., Peoria, IL (US)

( * ) Notice: Subject to any disclaimer, the term of this patent is extended or adjusted under 35 U.S.C. 154(b) by 137 days.

(21) Appl. No.: 14/341,452

(22) Filed: Jul. 25, 2014

(65) Prior Publication Data
US 2014/0345112 A1 Nov. 27, 2014

Related U.S. Application Data

(62) Division of application No. 13/170,350, filed on Jun. 28, 2011, now Pat. No. 8,820,797.

(60) Provisional application No. 61/361,686, filed on Jul. 6, 2010.

(51) Int. Cl.
F16L 33/20 (2006.01)
F16L 33/207 (2006.01)
E21B 17/042 (2006.01)

(52) U.S. Cl.
CPC ............. *F16L 33/20* (2013.01); *F16L 33/2076* (2013.01); *E21B 17/0423* (2013.01); *Y10T 29/49908* (2015.01)

(58) Field of Classification Search
CPC .......... F16L 33/2076; Y10T 29/49908; E21B 17/0423
See application file for complete search history.

(56) References Cited

U.S. PATENT DOCUMENTS

| 2,121,624 A | * | 6/1938 | Cowles | ............... F16L 33/2076 |
| | | | | 285/222.5 |
| 3,237,974 A | | 3/1966 | Press | |
| 3,257,132 A | | 6/1966 | Lyons | |
| 3,539,207 A | | 11/1970 | Harris | |
| 3,590,455 A | | 7/1971 | Harris | |
| 3,653,692 A | | 4/1972 | Henson | |
| 3,924,883 A | | 12/1975 | Frank | |
| 3,990,728 A | | 11/1976 | Coughlin | |
| 4,039,212 A | | 8/1977 | Skarud | |
| 4,328,982 A | | 5/1982 | Christianson | |
| 4,369,992 A | | 1/1983 | Fournier et al. | |

(Continued)

FOREIGN PATENT DOCUMENTS

| EP | 0685677 | 12/1995 |
| GB | 2229508 | 9/1990 |
| WO | 9418487 | 8/1994 |

*Primary Examiner* — Christopher Besler
*Assistant Examiner* — Jun Yoo
(74) *Attorney, Agent, or Firm* — Miller, Matthias & Hull LLP

(57) ABSTRACT

A hose coupling and method of manufacturing same are disclosed. The hose coupling includes a stem to which is staked a ferrule. The stem includes a radially inwardly directed groove into which a radially inwardly directed wedge of the ferrule is staked. The wedge includes a width that is greater than the width of the groove before staking. Moreover, the groove includes a bottom surface from which first and second canted sides extend at a first angle, while the wedge includes an inner surface from which first and second canted sides extend at a second angle. The first and second angles are not parallel but within five degrees of one another. The stem and ferrule form at least six distinct regions of surface contact to guard against rotation of the ferrule relative to the stem.

5 Claims, 3 Drawing Sheets

(56) References Cited

U.S. PATENT DOCUMENTS

| | | |
|---|---|---|
| 4,544,187 A | 10/1985 | Smith |
| 4,684,157 A * | 8/1987 | Smith ................ F16L 33/2076 285/256 |
| 4,758,029 A | 7/1988 | Davis |
| 5,137,309 A | 8/1992 | Beagle |
| 6,322,110 B1 | 11/2001 | Banker et al. |
| 6,491,325 B1 | 12/2002 | Boche |
| 6,764,106 B1 | 7/2004 | Smith et al. |
| 7,014,218 B2 | 3/2006 | Fisher et al. |
| 7,624,504 B2 | 12/2009 | Watanabe |
| 2004/0251683 A1 | 12/2004 | Fisher et al. |
| 2008/0185840 A1 | 8/2008 | Menor |
| 2010/0123310 A1 | 5/2010 | Miller et al. |

\* cited by examiner

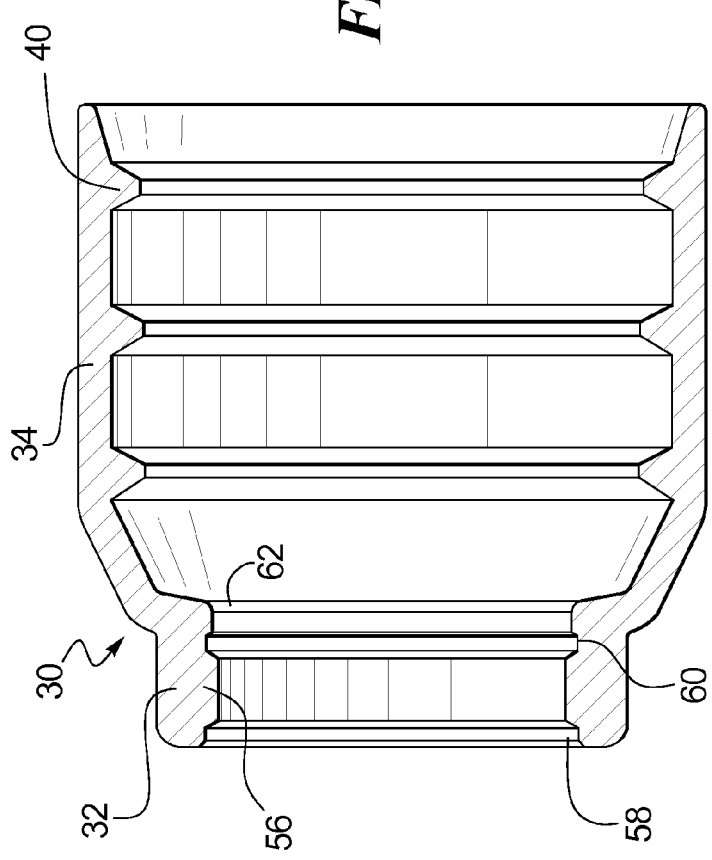
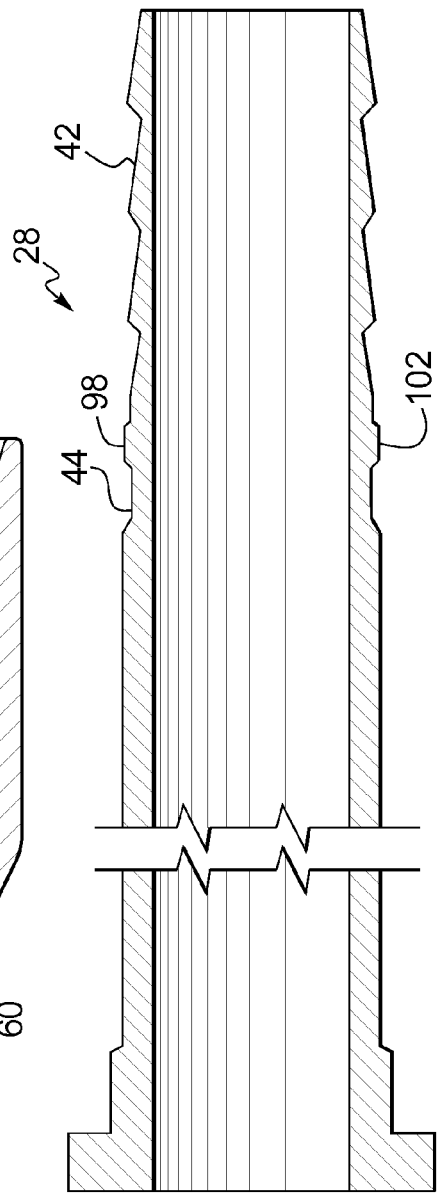

NON-ROTATING MECHANICAL JOINT FOR
A HOSE COUPLING

CROSS-REFERENCE TO RELATED
APPLICATIONS

This application is a divisional application of U.S. non-provisional patent application Ser. No. 13/170,350, filed on Jun. 28, 2011, which in turn claims priority under 35 USC §119(e) to U.S. Provisional Patent Application No. 61/361,686 filed on Jul. 6, 2010.

TECHNICAL FIELD

The present disclosure generally relates to hydraulic hose couplings and, more particularly, relates to hydraulic hose couplings having rotationally fixed components.

BACKGROUND

Hydraulic hose is indispensable in many industrial applications. For example, on various earth moving vehicles, hydraulic hose carries pressurized hydraulic fluid from a pump or pumps to one or more hydraulic cylinders provided on the vehicle to perform useful work. In the case of a loader, the hydraulic cylinders may be mounted so as to raise and lower one or more lifts arms, and then other hydraulic cylinders may be used to tilt or otherwise move a bucket or other implement mounted to the end of the lift arms.

In order to operate effectively, such hoses must communicate hydraulic fluid under very high pressures and under extreme temperature and work environments. Moreover, they must be manufactured to have high duty cycles enabling repeated use under such conditions for an extended period of time. The hose itself is typically manufactured with an inner liner manufactured from an elastomeric material enabling sealed communication of the hydraulic fluid, while enabling the hose to bend, twist, and turn as needed for operation of the vehicle. However, as the hydraulic fluid is under such extreme pressures, the elastomeric liner is then surrounded by a reinforcing layer, typically manufactured from metallic strands wrapped around the liner. Finally, to protect the liner and reinforcing layer from the ambient conditions, temperatures, and repeated abrasions likely to be encountered, the reinforcing layer is then typically surrounded with an elastomeric cover.

In order to connect such hose to the aforementioned cylinders and pumps, various types of couplings have been devised. Traditionally, the couplings would require the end of the hose to be skived wherein the outer cover of elastomeric material is shaved away down to the metallic reinforcing layer. Only when skived would the coupling be mounted directly to the underlying metal. As such couplings are, by necessity, relatively labor intensive and rely on the skill of the laborer to effect a good coupling and seal, no-skive couplings were introduced and have now been commonplace for some time. With a no-skive coupling, the hose is not altered at all, but rather the coupling is designed to penetrate the outer cover and engage the underlying metal to affect the seal.

Such no-skive couplings typically are attached to the end of the hose by crimping, swaging or some other form of mechanical force. More specifically, the coupling is slid onto the end of the hose in relatively loose fashion, and then a radially inwardly directed force is applied. In order to facilitate this process, a no-skive coupling includes an inner stem which is inserted into the hose, and an outer shell or ferrule extending from the stem and surrounding the outer cover of the hose. The shell is spaced from the stem so as to define an annular space adapted to receive the hose. Barbs or other surface features extend from the shell and/or stem to penetrate the hose during the crimping process to form a tight connection.

While effective, the attachment of the ferrule to the stem has proven to be, and continues to be, problematic. Currently, the ferrule and stem are separately manufactured and then mechanically joined together in a cold-forming process. In the cold-forming process, also known as staking, the ferrule is positioned around the stem and then a staking punch mechanically compresses the ferrule toward, and into, the stem. Sometimes the resulting interference fit is sufficient, but often times the interference fit loosens after repeated use and the ferrule begins to rotate about the stem. This is problematic for a number of reasons. One, such hydraulic hoses carry highly pressurized hydraulic fluid that must be communicated to the hydraulic cylinders in sealed fashion. Any rotating of the ferrule relative to the stem threatens the efficacy of that seal. Secondly, the coupling typically needs to be attached to the cylinder, pump, or the like, in a particular rotational orientation. If the rotational position of the ferrule relative to the stem changes, or is not reliably oriented, the connection cannot be made as easily or sometimes at all.

SUMMARY OF THE DISCLOSURE

In accordance with one aspect of the disclosure, a hose coupling is disclosed which may comprise a stem and a ferrule. The stem may have a radially inwardly directed groove of a first width dimension. The ferrule is attached to the stem and may include a radially inwardly directed interlocking wedge, wherein the wedge includes a second width dimension prior to being staked to the stem, and the second width dimension being greater than the first width dimension.

In accordance with another aspect of the disclosure, which may be combined with any of the aspects herein, the wedge may have a third width dimension after being staked to the stem wherein the third width dimension is greater than the second width dimension.

In accordance with another aspect of the disclosure, which may be incorporated with any of the aspects herein, the ferrule further includes a radially inwardly directed contact surface spaced from the interlocking wedge by a radially outwardly directed recess.

In accordance with another aspect of the disclosure, which may be combined with any of the aspects disclosed herein, the recess may include an inner surface parallel to the stem outer surface prior to staking and angled toward the stem groove after staking.

In accordance with another aspect of the disclosure, which may be combined with any of the aspects disclosed herein, the ferrule further includes a front lip in engagement with the outer surface of the stem after staking.

In accordance with another aspect of the disclosure, which may be combined with any of the aspects herein, the ferrule and the stem are in engagement along at least six distinct surfaces.

In accordance with another aspect of the disclosure, which may be combined with any of the aspects herein, the stem groove may include a bottom surface from which first and second canted sides radially outwardly extend toward a stem outer surface.

In accordance with another aspect of the disclosure which may be combined with any of the aspects herein, the ferrule wedge includes an inner surface from which first and second canted sides radially outwardly extend.

In accordance with another aspect of the disclosure, which may be combined with any of the other aspects disclosed herein, the first and second canted sides of the stem groove are non-parallel to the first and second canted sides of the wedge.

In accordance with another aspect of the disclosure, which may be combined with any of the aspects herein, the first and second canted sides of the stem groove are no more than five degrees out of parallel with the first and second canted sides of the ferrule wedge.

In accordance with another aspect of the disclosure, a method of forming a hose coupling is disclosed which may comprise providing a stem having a radially inwardly directed groove, wherein the groove has a first width dimension, positioning a shell around the stem wherein the shell includes a radially inwardly directed wedge, the wedge includes a second width dimension prior to attachment to the stem, and the second width dimension is greater than the first width dimension, and staking the shell to the stem, wherein the wedge is fully inserted into the groove during the staking process.

In accordance with another aspect of the disclosure, which may be combined with any of the other aspects herein, the stem groove may include a bottom surface and first and second canted sides radially outwardly extending from the bottom surface toward an outer surface of the stem.

In accordance with another aspect of the disclosure, which may be combined with any of the aspects disclosed herein, the wedge may include an inner surface and first and second canted sides radially outwardly extending from the inner surface.

In accordance with another aspect of the disclosure, which may be combined with any of the other aspects disclosed herein, the first and second canted sides of the stem groove and the first and second canted sides of the wedge are provided and are angled relative to one another so as to be non-parallel.

In accordance with another aspect of the disclosure, which may be combined with any of the other aspects disclosed herein, the first and second canted sides of the stem groove and first and second canted sides of the wedge include a difference in angles relative to one another of no more than five degrees.

In accordance with another aspect of the disclosure, which may be combined with any of the aspects disclosed herein, the shell further includes a contact surface spaced from the wedge by a radially outwardly extending recess, the contact surface being the first surface to contact the shell during the staking process.

In accordance with another aspect of the disclosure, which may be combined with any of the other aspects disclosed herein, the radially outwardly extending recess forms a fulcrum such that the wedge pivots into the groove and enhances material flow into the groove during the staking process.

In accordance with another aspect of the disclosure, which may be combined with any of the other aspects disclosed herein, the radially outwardly extending recess includes an inner surface which is substantially parallel to the stem outer surface prior to staking and which is angled toward the stem groove after the staking process.

In accordance with another aspect of the disclosure, a hose coupling is disclosed which may comprise a stem, a ferrule, an interlocking wedge, and a contact surface. The stem may have a radially inwardly directed groove having a flat bottom surface and first and second canted side walls angled relative to the bottom surface at a first angle. The groove may have a first width. The ferrule may have an attachment ring from which a circumferential shell outwardly extends. The ferrule may be staked to the stem at the attachment ring. The interlocking wedge radially inwardly extends from the attachment ring and is inserted into the stem groove. The interlocking wedge has a second width, wherein the second width is greater than the first width. The interlocking wedge includes an inner surface from which first and second canted walls radially outwardly extend at a second angle, wherein the first angle is different than the second angle. The contact surface radially inwardly extends from the attachment ring and is staked into the stem. The contact surface is separated from the interlocking wedge by a radially outwardly extending recess in the attachment ring, wherein the radially outwardly extending recess serves as a fulcrum and pivots the wedge relative to the contact surface when the ferrule is staked to the stem.

In accordance with another aspect of the disclosure, which may be combined with any of the other aspects disclosed herein, the first and second angles are within five degrees of each other.

These and other aspects and features of the disclosure will be better understood upon reading the following detailed description when taken in conjunction with the accompanying drawings.

BRIEF DESCRIPTION OF THE DRAWINGS

FIG. 5 is a sectional view of the ferrule by itself; and

FIG. 6 is a sectional view of the stem by itself.

DETAILED DESCRIPTION

Figure 1:
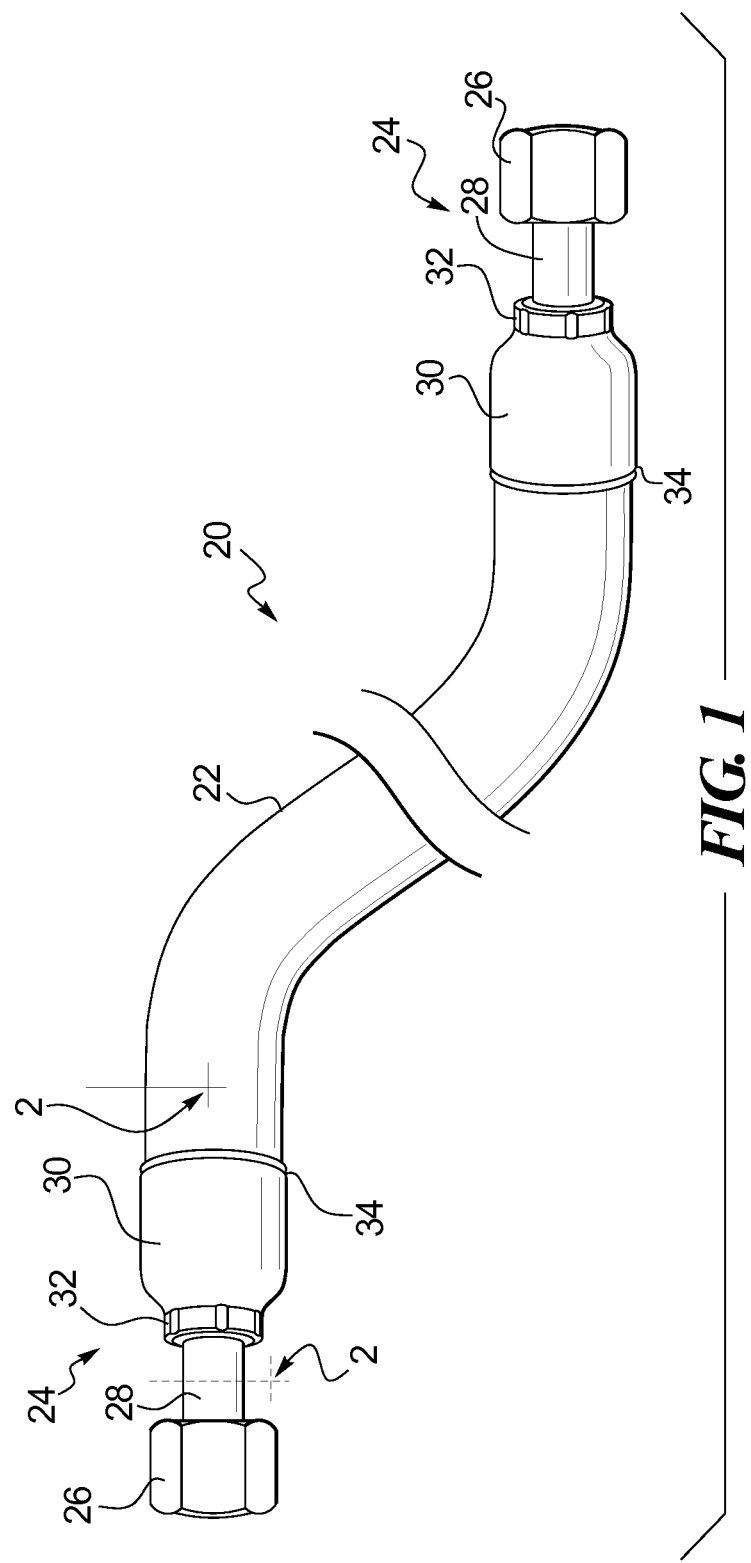
FIG. 1 is a perspective view of a hydraulic hose and hose coupling constructed in accordance with the teachings of the disclosure.

Referring now to the drawings, and with specific reference to FIG. 1, a hydraulic hose and coupling assembly is shown in detail and generally referred to as reference numeral 20. The assembly 20 includes a hydraulic hose 22 having couplings 24 attached to each end. While not related to the specifics of the pending disclosure, the couplings 24 shown are of a no-skive design, meaning that they can be attached by way of crimping to the hydraulic hose 22 without shaving or removing any of the outer layers of the hose 22. For purposes of completeness, it is important to note that the hydraulic hose 22 typically includes an inner elastomeric liner surrounded by metallic reinforcing layer, which in turn is surrounded by an elastomeric outer cover. The elastomeric materials enable the hydraulic fluid to be communicated therethrough in sealed fashion while also enabling the hose to move, bend, and twist as is needed in many industrial applications, while the reinforcing wire enables the inner liner to contain the significant pressures under which the hydraulic fluid is communicated. Finally, while the couplings 24 are shown having a threaded nut 26 extending therefrom, but it is to be understood that the teachings of this disclosure can be used in combination with couplings having different fittings as well.

Figure 2:
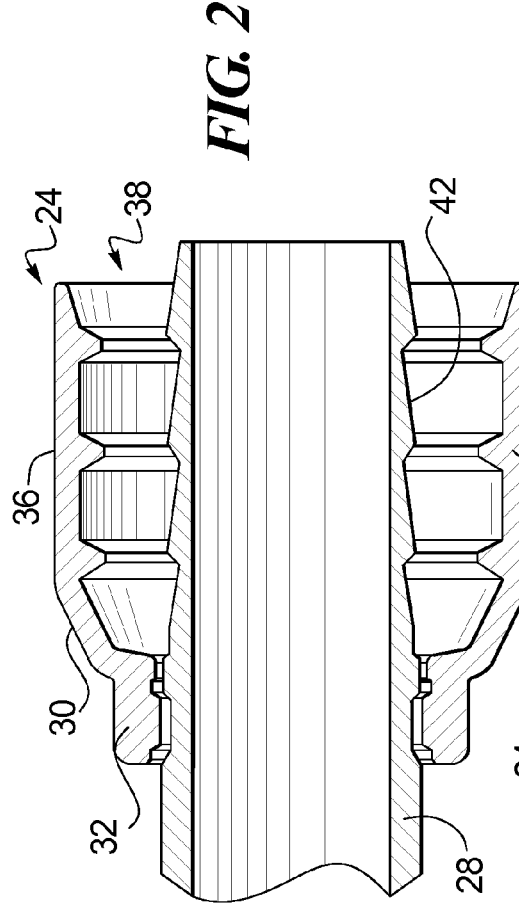
FIG. 2 is a perspective view of the hose coupling taken along line 2-2 of FIG. 1.

Turning now to FIG. 2, the coupling 24 is shown in more detail as taken along line 2-2 of FIG. 1. The coupling 24 includes an inner stem 28 to which is attached an outer ferrule. More specifically, the ferrule 30 includes an attachment ring 32 from which a circumferential shell 34 radially outwardly extends. The attachment ring 32 includes an outer surface 36 which may serve as a wrenching surface when attaching the coupling 24 to a pump cylinder or the like and which serves as a surface against which the cold-forming force is applied when staking the ferrule 30 to the stem 28 as will be described in further detail herein.

As will be noted, the outer shell 34 is substantially concentric with the inner stem 28 and defines an annular space 38 for receipt of the hose 22 (not shown in FIG. 2.). As the coupling 24 is a no-skive coupling, the shell 34 is provided with a plurality of radially inwardly directed barbs 40 to penetrate the outer cover and reinforcing layer of the coupling 24 and thereby secure the coupling 24 to the hose 22. In addition, the inner stem 28 is provided with a plurality of surface features 42 to facilitate the attachment of the coupling 24 to the hose 22.

Figure 4:
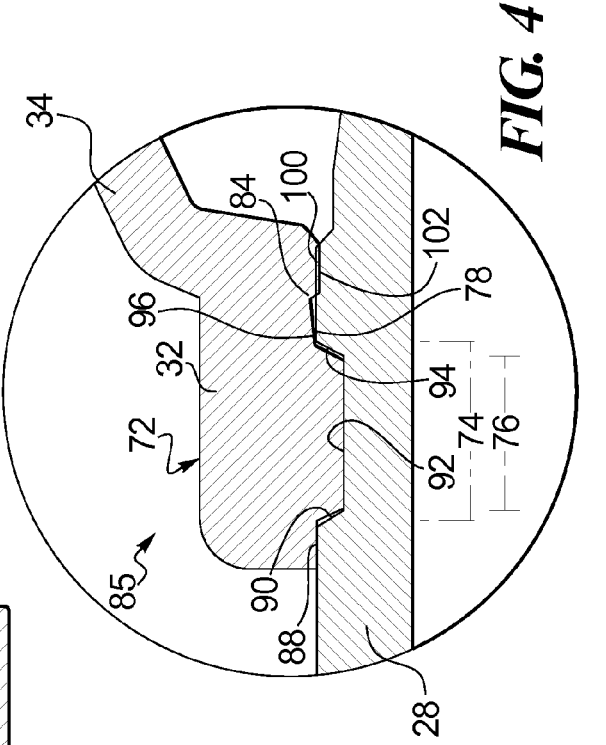
FIG. 4 is a enlarged sectional view similar to FIG. 3, but showing the ferrule attached to the stem after staking.
Figure 3:
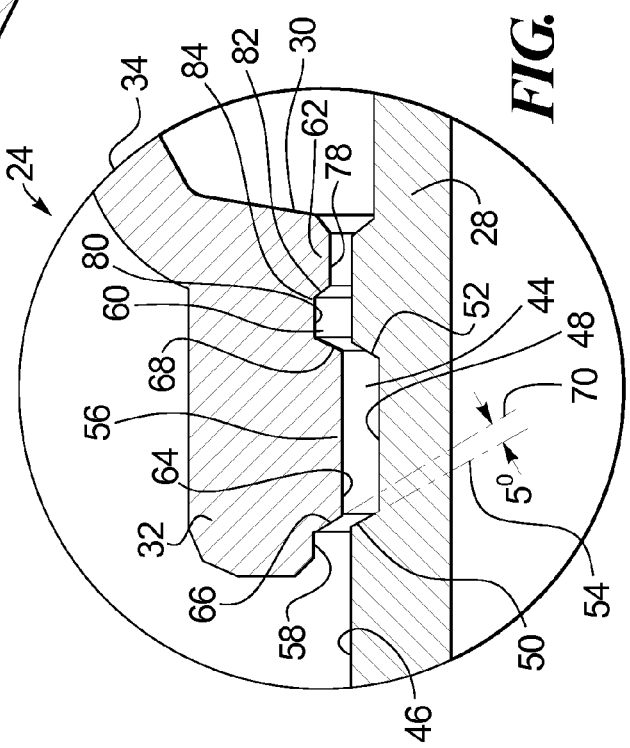
FIG. 3 is an enlarged sectional view of the ferrule and stem interface of FIG. 2.

With specific regard to the inventive contributions of the present disclosure, attention is directed to FIGS. 3 and 4, and the interlocking nature of the attachment between the stem 28 and the ferrule 30 so as to provide a mechanical joint with enhanced resistance to rotation of the ferrule 30 relative to the stem 28. FIG. 3 shows the ferrule 30 displaced from the inner stem 28 just prior to attachment, while FIG. 4 depicts the ferrule 30 attached to the stem 28 after the cold-forming and staking process is performed. Starting with FIG. 3, it will be noted that the inner stem 28 is provided with a radially inwardly directed groove 44 recessed inwardly relative to the outer surface 46 of the stem 28. The groove 44 may include a substantially flat and circumferential surface 48 from which first and second canted sides 50 and 52 radially outwardly extend but at an angle 54.

With respect to the attachment ring 32, it is shown to include a radially inwardly directed wedge 56, a lip 58, a recess 60, and a contact surface 62. The wedge 56 includes a substantially flat and circumferential surface 64 from which radially outwardly extending canted sides 66 and 68 extend at an angle 70. As will be discussed in further detail herein, the first angle 54 and second angle 70 are non-parallel.

A comparison between the starting position of FIG. 3 and the completed position of FIG. 4, shows that the ferrule 30 is attached to the stem 28 by forcing the wedge 56 into the groove 44. This may be performed by a cold forming process such as a staking process as is well known in the art. During such a process, a staking punch (not shown) applies significant radially inward force against the outer surface 36 of the attachment ring 32 along the direction indicated by arrow 72. The punch applies a pressure significant enough to overcome the structural integrity of the components involved and essentially heat, compress, and deform the materials into a mechanical joint. While the process of staking the ferrule to a stem has certainly been known, the specific process and structure used herein has not and as a result the pending disclosure sets forth a much more reliable joint with greatly enhanced resistance to relative rotation between the components.

One feature which enables these features to be obtained is the provision of the wedge 56 with a width 74 which is greater than the width 76 of the groove 44 into which it is staked. In this regard, reference to FIGS. 5 and 6 is helpful. As shown therein, the wedge 56 (FIG. 5) may include a width, in one exemplary embodiment, of 24 millimeters, while the groove 44 (FIG. 6) may include a width of 19.4 millimeters. It is important to note that these dimensions are provided simply for the purposes of an exemplary illustration that the wedge is wider than the groove and that the disclosure incorporates dimensions both greater and less than those depicted. However, in each embodiment, the wedge 56 will be wider than the groove 44. In so doing, when the ferrule 30 is staked to the inner stem 28, the ferrule 30 is essentially interlocked with the stem 28 to force a wedging action between the wedge and groove and thereby maximize the surface interference between the components. By enhancing the surface area which is in direct contact, and the force under which the components are staked together, the inventors have found that a stronger interference fit is formed with greatly enhanced resistance to relative rotation.

Another feature created by the present inventors, to form a mechanical joint with enhanced resistance to relative rotation is the provision of the contact surface 62. As will be noted, the contact surface 62 includes a substantially flat circumferential surface 78 spaced from the wedge 56 by the recess 60. In the unattached orientation of FIG. 3, the recess 60 includes a substantially flat circumferential surface 80 which is substantially parallel to the flat surface 78 and connected thereto by way of a canted side 82.

A significance of this structural formation is that when the staking punch applies its force to drive the wedge 56 into the groove 44, the recess 60 functions as a fulcrum, specifically at juncture 84 between the flat surface 80 and the canted side 82. This is due to that fact that the contact surface 62 is dimensioned relative to the wedge 56 such that as the ferrule 30 moves from the position of FIG. 3 to a position closer to the stem 28, the contact surface 62 first engages outer surface 46 of the stem 28 before any portion of the wedge 56 engages any portion of the stem 28. Once the contact surface 62 is in engagement with the outer surface 46 and the staking punch continues to direct its cold-forming force in the direction of arrow 72, the attachment ring 32 pivots relative to the contact surface 62 about juncture 84. As a result, as can be seen in FIG. 4, after the staking process the flat surface 80 of the recess 60 is no longer parallel to the flat surface 78 of the contact surface 62, but rather is transverse relative to the contact surface 62 and in fact is angled toward the groove 44.

The inventors have found that this is also of significant advantage in forming a mechanical joint between the components with enhanced resistance to relative rotation in that by having the contact surface 62 first contact the stem 28 and enabling the wedge 56 to pivot into the groove 44, material flow into the interlock, as well as increased surface friction between the components is greatly enhanced. In other words, the contact surface 62 forms a first point of contact relative to the stem during the cold-forming (staking) operation. It creates a fulcrum point that helps force more of the material flow into the interlock region 85 between the wedge 56 and the groove 44 to help ensure the interlocking features are fully engaged with each other. It also helps create one more point of high surface friction between the components to reduce the likelihood of the ferrule 30 spinning relative to the stem 28.

In the latter regard, it is also an important contribution of the pending disclosure that an increased number of distinct regions of surface contact between the ferrule 30 and stem 28 are created. More specifically, in the depicted embodiment, six (6) distinct regions 86 of surface area contact are created. Those six distinct regions 86 are identified in FIG. 4 as interface 88 between stem outer surface 46 and lip 58, interface 90 between groove canted side 50 and wedge canted side 66, interface 92 between groove flat surface 48 and wedge flat surface 64, interface 94 between groove second canted side 52 and wedge second canted side 68, interface 96 between recess flat surface 80 and stem outer surface 98, and interface 100 between contact surface 62 and stem outer surface 102.

By providing such a greatly enhanced overall surface area contact between the ferrule 30 and stem 28, and doing so under the significant pressures generated by the staking punch, greatly enhanced resistance to relative rotation between the components is created. Moreover, by providing the wedge 56 with a width 74 which is greater than the width 76 of the groove 44, the surface area contact interference between the two is also enhanced. Finally, by providing the canted surfaces of the groove and the wedge at different angles, a wedging action is created which interlocks the components, increases the surface area contact between the components, and improves the resistance through relative rotation between the ferrule and the stem.

INDUSTRIAL APPLICABILITY

In general, it can be seen that the technology disclosed herein has industrial applicability in a variety of settings such as, but not limited to, the formation of a mechanical joint for use in such things as hydraulic hose couplings. Hydraulic hose couplings are used in myriad industrial applications such as earth moving vehicles. Such earth moving vehicles may include, but are not limited to, loaders, excavators, scrappers, graders, lift trucks, skid steers, track type tractors, pipe layers, and rollers, all of which employ the use of pressurized hydraulic fluid to drive cylinders attached to the work implements of the vehicles. An engine of the vehicle, typically a diesel engine, powers a pump to pressurize the hydraulic fluid which is directed through hydraulic hoses to drive the cylinders.

In order to connect such pumps and cylinders, the hydraulic couplings, which are described in detail above, may be used. As the hydraulic fluid must be maintained within the hoses in a sealed fashion, it is important that the coupling remain fixed in position relative to the hose. This is made more challenging, not only by the significant pressures under which the hydraulic fluid is communicated, but due to the fact that the hoses and thus the couplings are constantly subjected to motion as the vehicle performs work. This motion includes linear motion, reciprocating motion, rotational motion, bending forces, torquing forces, and the like. However, any relative rotation between the ferrule and the stem can affect the efficacy of the coupling. Moreover, many hydraulic couplings are specifically designed for attachment to a pump, cylinder, or the like in only a specific rotational orientation. Accordingly, any rotation of the ferrule relative to the stem will necessarily affect this orientation and may, at the very least, make connection more difficult, and at the worst, make such connection impossible.

The pending disclosure improves such couplings by creating a hydraulic hose coupling with an improved mechanical and interlocking joint between a ferrule and a stem. The connection is performed by way of a staking process but through the unique incorporation of wedges, recesses, contact points, fulcrums, surface features, dimensions, and angles, the mechanical interference fit between the components is greatly enhanced and thus the likelihood of relative rotation between the components is decreased.

What is claimed is:

1. A method of forming a hose coupling, comprising:
providing a stem having an outer surface and a radially inwardly directed groove, the groove having a first width dimension;
positioning a ferrule around the stem, the ferrule including a radially inwardly directed wedge, the wedge including a second width dimension prior to attachment to the stem, the second width dimension being greater than the first width dimension, the ferrule further including a contact surface spaced from the wedge by a radially outwardly extending recess, the contact surface being the first surface to contact the stem during the staking process, the radially outwardly extending recess forming a fulcrum such that the wedge pivots into the groove and enhances material flow into the groove during the staking process, wherein the radially outwardly extending recess includes an inner surface which is substantially parallel to the stem outer surface prior to staking, and which is angled toward the stem groove after the staking process; and
staking the ferrule to the stem, the wedge being fully inserted into the groove after the staking process.

2. The method of claim 1, wherein the stem groove includes a bottom surface and first and second canted sides radially outwardly extending from the bottom surface toward an outer surface of the stem.

3. The method of claim 2, wherein the wedge includes an inner surface and first and second canted sides radially outwardly extending from the inner surface.

4. The method of claim 3, wherein the first and second canted sides of the stem groove are angled relative to the first and second canted sides of the wedge so as to be non-parallel.

5. The method of claim 4, wherein the first and second canted sides of the stem groove and the first and second canted sides of the wedge include a difference in angles relative to one another of no more than five degrees.

* * * * *